(12) United States Patent
Jung et al.

(10) Patent No.: US 8,155,062 B2
(45) Date of Patent: Apr. 10, 2012

(54) SYSTEM AND METHOD FOR TRANSMITTING AND RECEIVING COMMON CONTROL INFORMATION IN A WIRELESS COMMUNICATION SYSTEM

(75) Inventors: Young-Ho Jung, Suwon-si (KR); Yung-Soo Kim, Seongnam-si (KR); Myeon-Kyun Cho, Seongnam-si (KR); Yu-Seok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 841 days.

(21) Appl. No.: 12/120,745

(22) Filed: May 15, 2008

(65) Prior Publication Data

US 2008/0285513 A1    Nov. 20, 2008

(30) Foreign Application Priority Data

May 17, 2007    (KR) .................. 10-2007-0048301

(51) Int. Cl.
*H04W 4/00* (2009.01)
*H04J 3/00* (2006.01)
(52) U.S. Cl. ......... 370/329; 370/330; 370/336; 370/337
(58) Field of Classification Search .................. 370/329, 370/330, 336, 337; 455/501, 502
See application file for complete search history.

(56) References Cited

U.S. PATENT DOCUMENTS

| 7,233,804 | B2 | 6/2007 | Sugaya et al. | |
|---|---|---|---|---|
| 7,688,926 | B2 | 3/2010 | Suh et al. | |
| 7,876,840 | B2 * | 1/2011 | Tong et al. | 375/260 |
| 7,885,214 | B2 * | 2/2011 | Ahmadi et al. | 370/295 |
| 7,936,717 | B2 * | 5/2011 | Cho et al. | 370/329 |
| 2007/0160040 | A1 * | 7/2007 | Kwon | 370/389 |
| 2008/0039107 | A1 * | 2/2008 | Ma et al. | 455/450 |
| 2008/0095195 | A1 * | 4/2008 | Ahmadi et al. | 370/478 |
| 2008/0205365 | A1 * | 8/2008 | Russell et al. | 370/341 |
| 2008/0219203 | A1 * | 9/2008 | Chou et al. | 370/315 |
| 2009/0109914 | A1 * | 4/2009 | McBeath et al. | 370/329 |
| 2009/0147742 | A1 * | 6/2009 | Tsai et al. | 370/329 |
| 2009/0252082 | A1 * | 10/2009 | Chang et al. | 370/315 |
| 2010/0008328 | A1 * | 1/2010 | Maheshwari et al. | 370/331 |
| 2010/0011273 | A1 * | 1/2010 | Parolari | 714/749 |
| 2010/0046464 | A1 * | 2/2010 | Kwak et al. | 370/330 |
| 2010/0226348 | A1 * | 9/2010 | Thoukydides | 370/338 |
| 2011/0002320 | A1 * | 1/2011 | Yuk et al. | 370/338 |

(Continued)

FOREIGN PATENT DOCUMENTS

JP    2003-258812    9/2003

(Continued)

*Primary Examiner* — Chi H Pham
*Assistant Examiner* — Farah Faroul
(74) *Attorney, Agent, or Firm* — The Farrell Law Firm, P.C.

(57) ABSTRACT

A method and apparatus for transmitting common control information by a base station in a wireless communication system are provided. The base station determines whether a first system and a second system different from the first system coexist in a wireless communication system. When the wireless communication system is a coexistence system, the base station indicates information for coexistence of the first system and the second system, position and size information of a resource allocation zone where common control information for the second system can be transmitted, and information necessary for decoding of the resource allocation zone, through a first information element in a downlink subframe where resources are occupied for the first system. The base station transmits the common control information of the second system in the resource allocation zone where the common control information can be transmitted.

31 Claims, 13 Drawing Sheets

U.S. PATENT DOCUMENTS

| | | | |
|---|---|---|---|
| 2011/0013543 A1* | 1/2011 | Lim et al. | 370/281 |
| 2011/0103494 A1* | 5/2011 | Ahmadi | 375/260 |
| 2011/0194529 A1* | 8/2011 | Cho et al. | 370/331 |
| 2011/0274066 A1* | 11/2011 | Tee et al. | 370/329 |

FOREIGN PATENT DOCUMENTS

| | | |
|---|---|---|
| JP | 2006-304312 | 11/2006 |
| WO | WO 2005/039105 | 4/2005 |
| WO | WO 2005/119941 | 12/2005 |

* cited by examiner

SYSTEM AND METHOD FOR TRANSMITTING AND RECEIVING COMMON CONTROL INFORMATION IN A WIRELESS COMMUNICATION SYSTEM

PRIORITY

This application claims priority under 35 U.S.C. §119(a) to a Korean Patent Application filed in the Korean Intellectual Property Office on May 17, 2007 and assigned Serial No. 2007-48301, the disclosure of which is incorporated herein by reference.

BACKGROUND OF THE INVENTION

1. Field of the Invention

The present invention relates generally to a wireless communication system, and more particularly, to a system and method for transmitting and receiving common control information in a wireless communication system.

2. Description of the Related Art

Presently, wireless communication systems are being developed to support various services such as broadcasting, multimedia video, multimedia messaging, etc. In particular, the $4^{th}$ generation wireless communication system is being developed to provide a data rate of 100 Mbps or higher to high-speed mobile users, and a data rate of 1 Gbps or higher to low-speed mobile users, in voice and packet data communications.

The wireless communication systems are developing from the existing communication systems into evolved communication systems. Herein, the existing communication system will be referred to as a 'legacy communication system', and the evolved communication system will be referred to as a 'new communication system'.

The new communication system intends to introduce new (evolved) technologies unused in the legacy communication system. The new technologies include multi-antenna technology, Internet Protocol version 6 (IPv6) technology, multicast/broadcast service technology, etc. With the development of technologies for communication systems, there it is possible for the legacy communication system and the new communication system to coexist in one communication system. If the communication systems continue to develop, the new communication system can eventually replace the legacy communication system.

In the situation where the two communication systems coexist, the two communication systems should interwork with each other for users of the legacy communication system and users of the new communication system. When the legacy communication system is replaced with the new communication system, new technical schemes for supporting the replacement should be defined, because the legacy communication system and the new communication system may have different channel structures and/or different signaling structures.

Meanwhile, issues that should be importantly dealt with in both communication systems are transmission/reception of common control information. The common control information is important information that all mobile stations existing in the system should receive. Therefore, in the case where the legacy communication system and the new communication system coexist, a transmission/reception scheme of the common control information should be defined. Even in the case where the legacy communication system is replaced with the new communication system, a transmission/reception scheme of the common control information should be newly defined.

SUMMARY OF THE INVENTION

The present invention has been made to address at least the above problems and/or disadvantages and to provide at least the advantages described below. Accordingly, an aspect of the present invention provides a system and method for transmitting and receiving common control information caused by the development of wireless communication systems.

According to one aspect of the present invention, a method is provided for transmitting common control information by a base station in a wireless communication system. It is determined whether the wireless communication system is a coexistence system, in which a first system and a second system, different from the first system, coexist. When the wireless communication system is a coexistence system, information for coexistence of the first system and the second system, position and size information of a resource allocation zone where common control information for the second system can be transmitted, and information necessary for decoding of the resource allocation zone, through a first information element in a downlink subframe where resources are occupied for the first system, are indicated. The common control information of the second system is transmitted in the resource allocation zone where the common control information can be transmitted.

According to another aspect of the present invention, a method is provided for receiving common control information by a mobile station in a wireless communication system. Information on a frame structure transmitted from a base station is decoded. It is determined whether a wireless communication system is a coexistence system where a first system and a second system different from the first system coexist. Common control information for the first system is decoded when the wireless communication system is a coexistence system. Information on a position and size where common control information for the second system is transmitted, and information necessary for decoding of the common control information according to the decoding result on the common control information are acquired. Common control information for the second system is decoded using the acquired information.

According to a further aspect of the present invention, a wireless communication system is provided that includes a mobile station, and a base station. The base station determines whether a first system and a second system, different from the first system, coexist in the wireless communication system. When the wireless communication system is coexistence system, in which the first system and the second system coexist, the base station indicates information for coexistence of the first system and the second system, position and size information of a resource allocation zone where common control information for the second system can be transmitted, and information necessary for decoding of the resource allocation zone, through a first information element in a downlink subframe where resources are occupied for the first system. The base station transmits the common control information of the second system in the resource allocation zone where the common control information can be transmitted. The mobile station decodes information on a frame structure transmitted from the base station; determines whether the wireless communication system is a coexistence system where the first system and the second system, different from the first system, coexist; decodes common control information for the first system when the wireless communication system is a coexistence system; acquires information on a position and size where common control information for the second system is transmitted, and information necessary for decoding of the common control information according to the decoding result on the common control information; and decodes common control information for the second system using the acquired information.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1A:
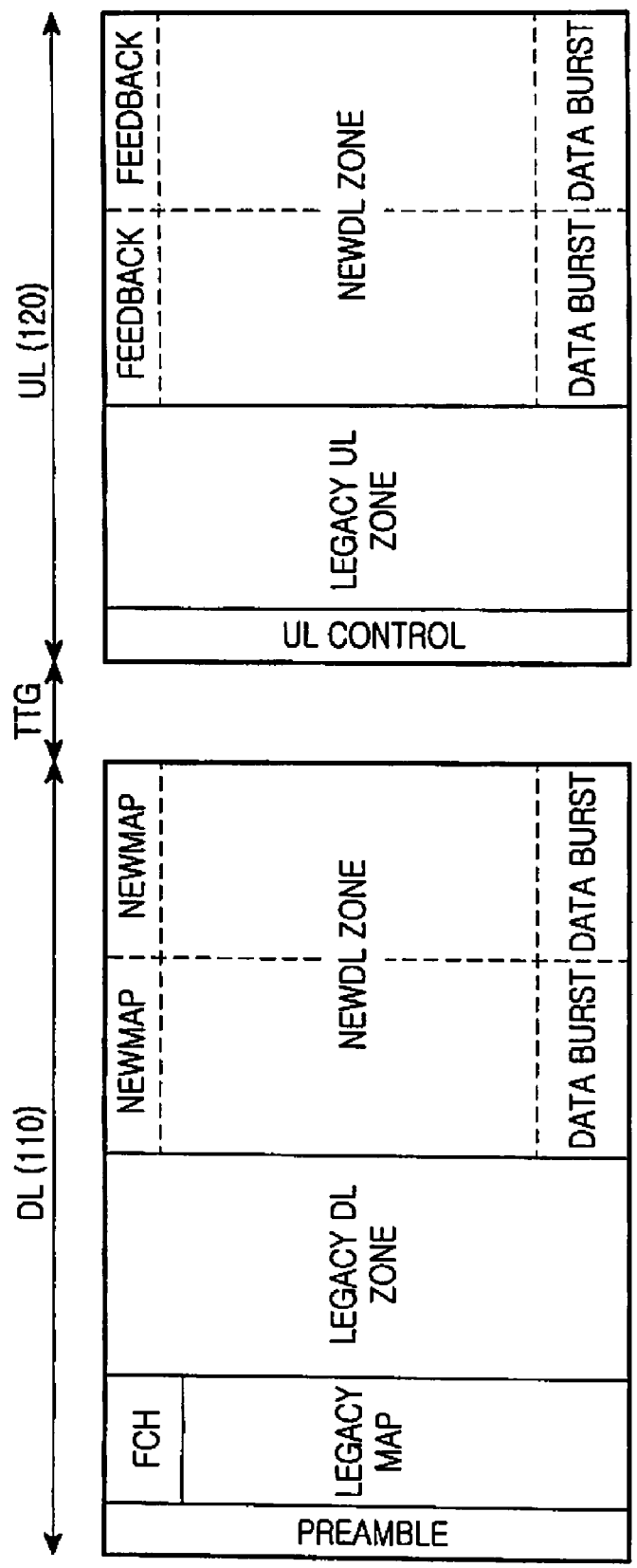
FIGS. 1A and 1B are diagrams illustrating frame structures based on Time Division Multiplexing (TDM) and Frequency Division Multiplexing (FDM), respectively.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

The present invention provides a system and method for transmitting and receiving common control information in a wireless communication system. Herein, the wireless communication system can be a system where the existing (or legacy) communication system and a new communication system evolved from the legacy communication system coexist, or a system where the legacy communication system is replaced by the new communication system. The term 'common control information' as used herein refers to both of the information included in a Frame Control Header (FCH) and MAP used in the legacy communication system, and the information included in a Broadcasting Channel (BCH) of the new communication system of the present invention.

Figure 1B:
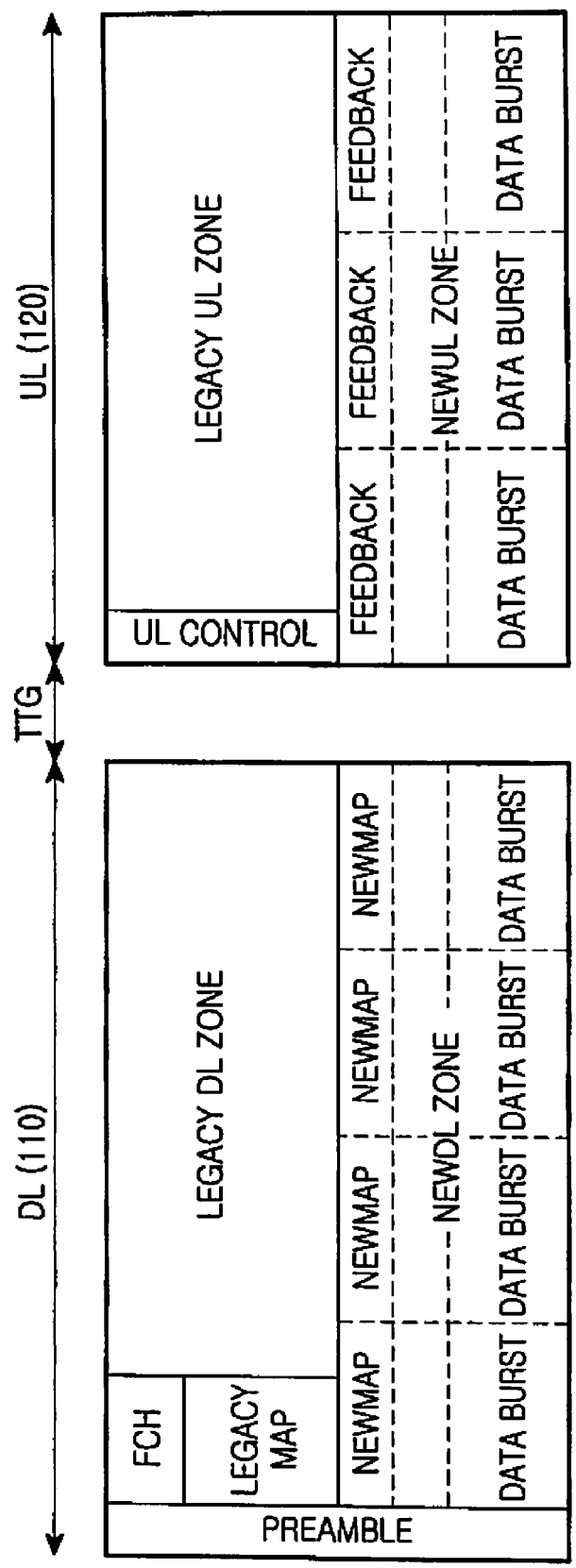

In the coexistence system, the legacy communication system and the new communication system can be distinguished from each other by time or frequency. Similarly, the downlink can be divided by the time and the uplink can be divided by the frequency, and vice versa. With reference to FIGS. 1A and 1B, a description will now be made of a frame structure available in the coexistence system.

FIGS. 1A and 1B are diagrams illustrating frame structures based on Time Division Multiplexing (TDM) and Frequency Division Multiplexing (FDM), respectively.

Referring to FIG. 1A, a frame includes a preamble used in common in the legacy communication system and the new communication system, and a downlink subframe (DL) and an uplink subframe (UL) that distinguish the legacy communication system from the new communication system by time. The downlink subframe is distinguished from the uplink subframe by Time Transition Gap (TTG). A ratio of resources used by the legacy communication system to resources used by the new communication system in the downlink subframe 110 and the uplink subframe 120 can be fixedly determined during initial system realization depending on the number of mobile stations using the corresponding system and/or other various factors, or can be variably determined during system operation. Also, the resource ratio of the downlink subframe 110 to the uplink subframe 120 can be fixedly determined during initial system realization depending on the number of mobile stations using the corresponding system and/or other various factors, or can be variably determined during system operation.

A frame in FIG. 1B is similar in structure to the frame of FIG. 1A, but it is different in that the legacy communication system is distinguished from the new communication system by frequency.

Figure 2:
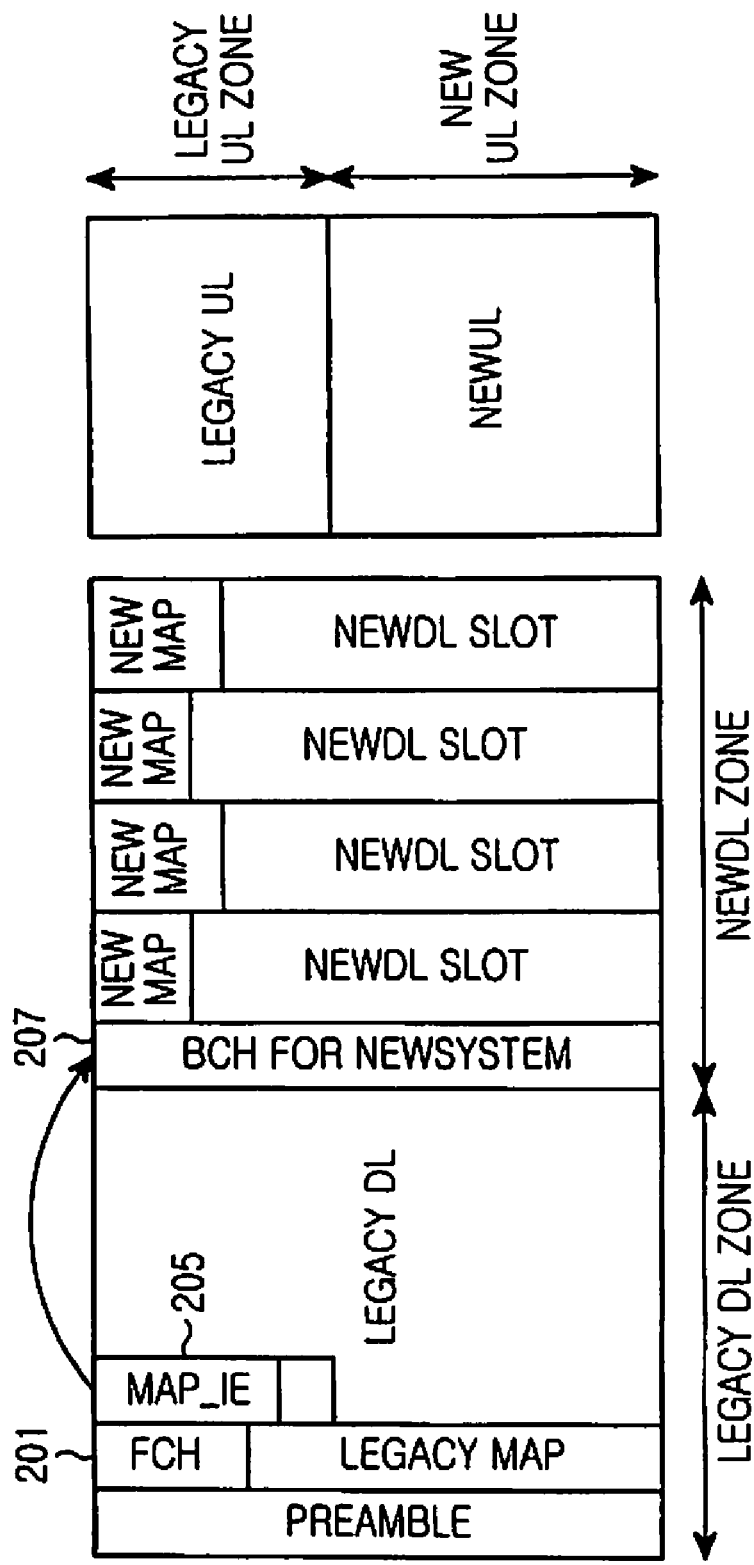
FIG. 2 is a diagram illustrating a frame structure including a Broadcasting Channel (BCH) for a new system, to be used for a coexistence system, according to an embodiment of the present invention.

FIG. 2 is a diagram illustrating a frame structure including BCH for a new system, to be used for a coexistence system, according to an embodiment of the present invention.

With reference to FIG. 2, a description is made of a first method for transmitting BCH decoding information of the new system according to the present invention. A frame includes a FCH 201, a legacy MAP, a MAP Information Element (MAP_IE) 205, and a BCH 207.

As for a mobile station using the legacy communication system, the mobile station acquires synchronization with a base station through a preamble, and decodes the FCH 201. The mobile station decodes the legacy MAP using the FCH decoding result, thereby recognizing position and size of its own data burst.

Using some bits among the reserved bits of FCH unused in the legacy system, the base station transmits information indicating whether the corresponding frame is a frame only for the legacy communication system, a frame for the coexistence system, or a frame only for the new communication system. The mobile station recognizes whether the corresponding frame is a frame only for the legacy communication system, a frame for the coexistence system, or a frame only for the new communication system depending on the reserved bit value of the corresponding FCH. Although the scheme of transmitting the legacy/new system coexistence information using the reserved bits of FCH has been described above, a method for transmitting the corresponding information can also be considered by transmitting different types of preambles.

As shown in FIG. 2, in the coexistence system, the mobile station determines whether there is any MAP IE corresponding to a previously allocated Group Connection Identifier (GCID). Herein, the GCID, an arbitrary CID among the CIDs allocable to mobile stations using the legacy communication system, is a CID predefined between the base station and the new communication system. The base station secures it by not allocating the corresponding CID to a legacy mobile station, and the GCID is used for distinguishing a mobile station using the new communication system. For example, the mobile station using the new communication system can be allocated an arbitrary CID of '10101010101010' as the same GCID regardless of the base station. The base station can secure multiple CIDs as GCIDs of mobile stations for the new communication system, and then allocate a different CID to the mobile station separately for each base station. In this case, there is a possible mapping relation between base station ID information and GCID transmitted through the preamble.

When there is a MAP_IE 205 allocated to the corresponding GCID, the mobile station acquires position and decoding information of the BCH 207 using information included in the MAP IE 205, and decodes the BCH 207 depending on the acquired information. The BCH 207 includes frame structure information for the new communication system, and the decoding information includes Modulation and Coding Scheme (MCS) level information, packet length information, Multiple-Input Multiple-Output (MIMO) mode information, H-ARQ-related information, etc. The BCH 207 can be generated by applying the MCS level and packet length preset by the system.

In the coexistence system of the legacy system and the new system, there is a method for positioning the BCH in the last symbol of a downlink subframe (DL) zone as a second method for transmitting BCH position information of the new system. As to the things to be considered in this case, a ratio of the downlink subframe to the uplink subframe in the frame is variable. For example, in a system having an 8.75 MHz bandwidth of a Mobile WiMAX profile, the ratio is changeable up to DL:UL=30:12~24:18 in units of 1 symbol. If the transmission position of BCH is assumed to be the last symbol of the DL zone as stated above and a DL/UL ratio of the coexistence system is assumed to be changeable in units of 2 symbols, the BCH positions can be $24^{th}$, $26^{th}$, $28^{th}$ and $30^{th}$ symbols.

Therefore, the base station should provide information on such various cases to the mobile station. There is a method for providing information on the DL:UL ratio to a mobile station of the new system using FCH. Table 1 shows a conventional FCH format.

TABLE 1

| Syntax | Size (bits) | Notes |
| --- | --- | --- |
| DL_Frame_Prefix_Format( ) { | | |
| Used subchannel bitmap | 6 | Bit #0: subchannel group 0<br>Bit #1: subchannel group 1<br>Bit #2: subchannel group 2<br>Bit #3: subchannel group 3<br>Bit #4: subchannel group 4<br>Bit #5: subchannel group 5 |
| reserved | 1 | Shall be set to zero |
| Repetition_Coding_Indication | 2 | 0b00 - No repetition coding on DL-MAP<br>0b01 - Repetition coding of 2 used on DL-MAP<br>0b10 - Repetition coding of 4 used on DL-MAP<br>0b11 - Repetition coding of 6 used on DL-MAP |
| Coding_Indication | 3 | 0b000: CC encoding used on DL-MAP<br>0b001: BTC encoding used on DL-MAP<br>0b010: CTC encoding used on DL-MAP<br>0b011: ZT CC encoding used on DL-MAP<br>0b100: LDPC encoding used on DL-MAP<br>0b101 to 0b111 - Reserved |
| DL-MAP_Length | 8 | |
| reserved<br>} | 4 | Shall be set to zero |

As shown in Table 1, FCH has a total of 5 reserved bits, and 4 of the 5 reserved bits are used herein. Therefore, the base station can provide BCH position and DL/UL ratio information to the mobile station using 2 bits among the 4 reserved bits. For example, a value written in the field indicating the BCH position and DU/UL ratio information as a result of FCH decoding made by the mobile station is assumed to be '00'. The value '00' indicates that BCH is positioned in the $24^{th}$ symbol and a DL:UL ratio is 24:18. In this case, regarding information on the legacy communication system, the coexistence system and the new communication system, the types of preambles are classified for the legacy communication system, the coexistence system and the new communication system, and with use of a preamble associated with the corresponding system, the mobile station can determine to which system the frame corresponds. There is another scheme in which the mobile station can perceive a frame according to the success/failure in BCH decoding in a predetermined position without separate information reception.

With use of 3 bits among the 4 reserved bits of FCH, it is also possible to indicate at once whether the corresponding frame in addition to the BCH position and DL/UL ratio information is only for the legacy communication system, for the coexistence system, or only for the new communication system. For example, '000' means that the corresponding frame is a frame only for the legacy communication system and there is no BCH at this time. '001' means that the corresponding frame is a frame for the coexistence system and BCH is positioned in the $24^{th}$ symbol at this time. '010' means that the corresponding frame is a frame for the coexistence system and BCH is positioned in the $26^{th}$ symbol at this time. '011' means that the corresponding frame is a frame for the coexistence system and BCH is positioned in the $28^{th}$ symbol at this time. '100' means that the corresponding frame is a frame for the coexistence system and BCH is positioned in the $30^{th}$ symbol at this time. '101' means that the corresponding frame is a frame only for the new communication system and BCH is positioned in the $1^{st}$ symbol after a symbol corresponding to the preamble of the downlink subframe at this time. The positions of BCH in the frame structure only for the new communication system will be described in detail with reference to FIGS. 4 to 6.

The use of the foregoing BCH position information transmission method can simply make a ratio change between the downlink subframe and the uplink subframe, and a ratio change between the legacy communication system and the new communication system. The mobile station using the new communication system has no need to decode the legacy MAP like the first method.

Figure 3A:
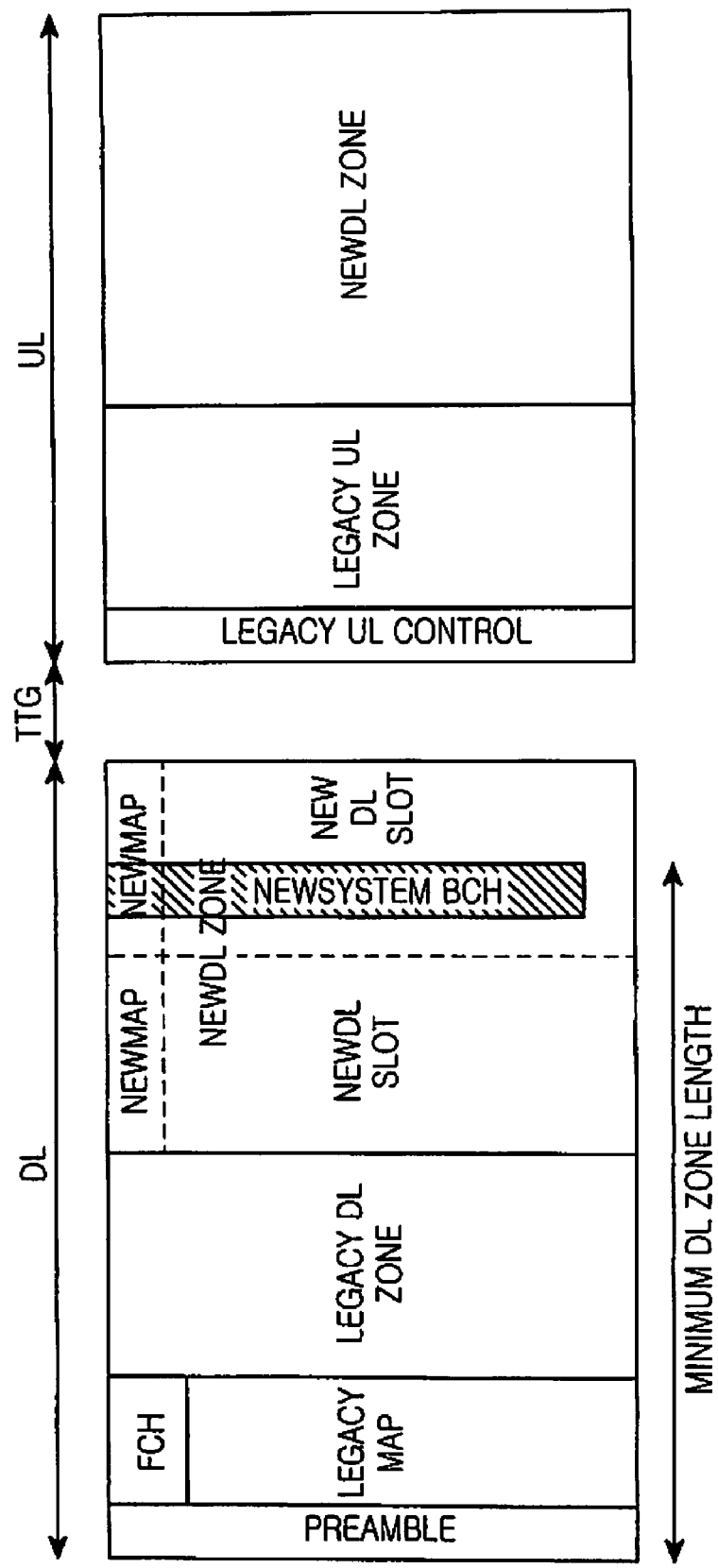
FIGS. 3A and 3B are diagrams illustrating frame structures where BCH is positioned in a particular symbol according to an embodiment of the present invention.
Figure 3B:
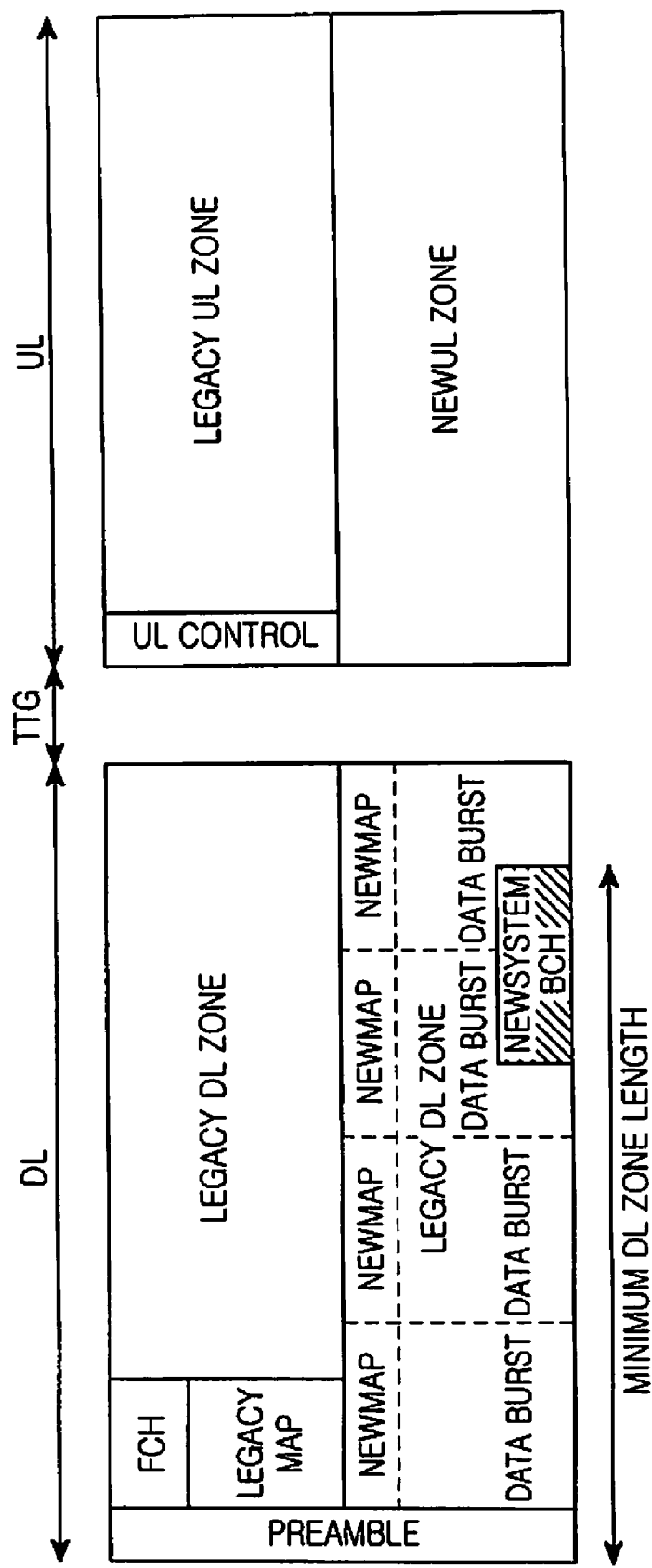

As a third BCH decision method, there is a method for positioning BCH in a particular symbol taking the possible DL/UL change range into account. In this case, since BCH is always transmitted in the fixed position, there is no need for transmission of separate position information. Frame structures for this are shown in FIGS. 3A and 3B.

As described above, in the system having a 8.75 MHz bandwidth of a Mobile WiMAX profile, the ratio is changeable up to DL:UL=30:12~24:18 in units of 1 symbol. Therefore, the second BCH decision method is a method for positioning BCH in the $24^{th}$ symbol on the basis of the frame structure having a ratio of DL:UL=24:18. For example, even in the frame structure having a ratio of DL:UL=30:12, BCH is positioned in the $24^{th}$ symbol, and even in the frame structure having a ratio of DL:UL=24:18, BCH is positioned in the $24^{th}$ symbol, i.e., the last symbol. The BCH can also be positioned in the downlink subframe for the legacy communication system. BCH positioned in the $24^{th}$ symbol includes common control information for the new communication system in the next frame.

The use of the foregoing third BCH decision method can simply make a ratio change between the downlink subframe and the uplink subframe, and a ratio change between the legacy communication system and the new communication system. The mobile station using the new communication system has no need to decode the legacy MAP. In addition, the frame structure only for the new communication system has no need to include the legacy FCH and the legacy MAP. Meanwhile, BCH in the FDM-based frame structure of FIG. 3B can have predetermined frequency resources and positions from the $24^{th}$ symbol till its preceding predetermined symbol.

Figure 4:
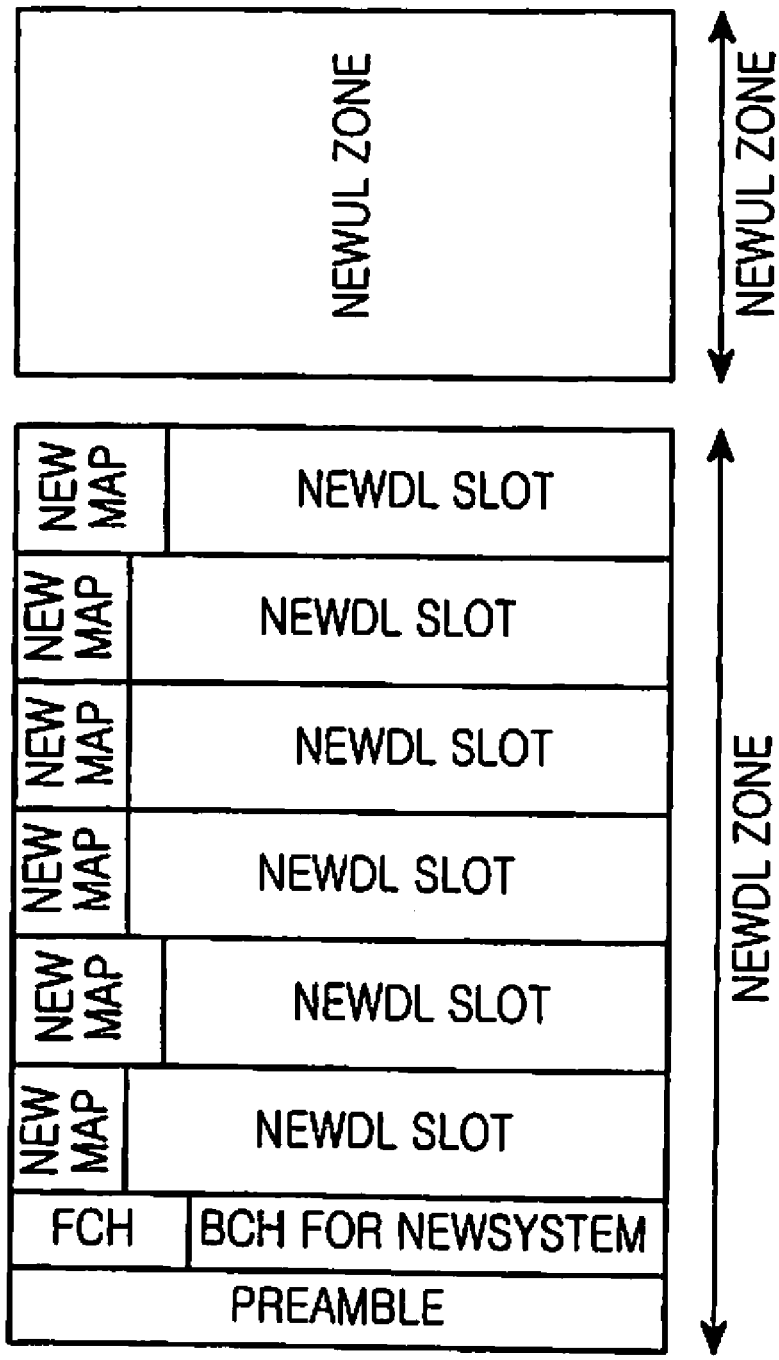
FIG. 4 is a diagram illustrating a frame structure only for a new communication system according to an embodiment of the present invention.

FIG. 4 is a diagram illustrating a frame structure only for a new communication system according to an embodiment of the present invention.

Referring to FIG. 4, it can be noted that BCH is positioned in the first symbol after a preamble in the frame.

Figure 5A:
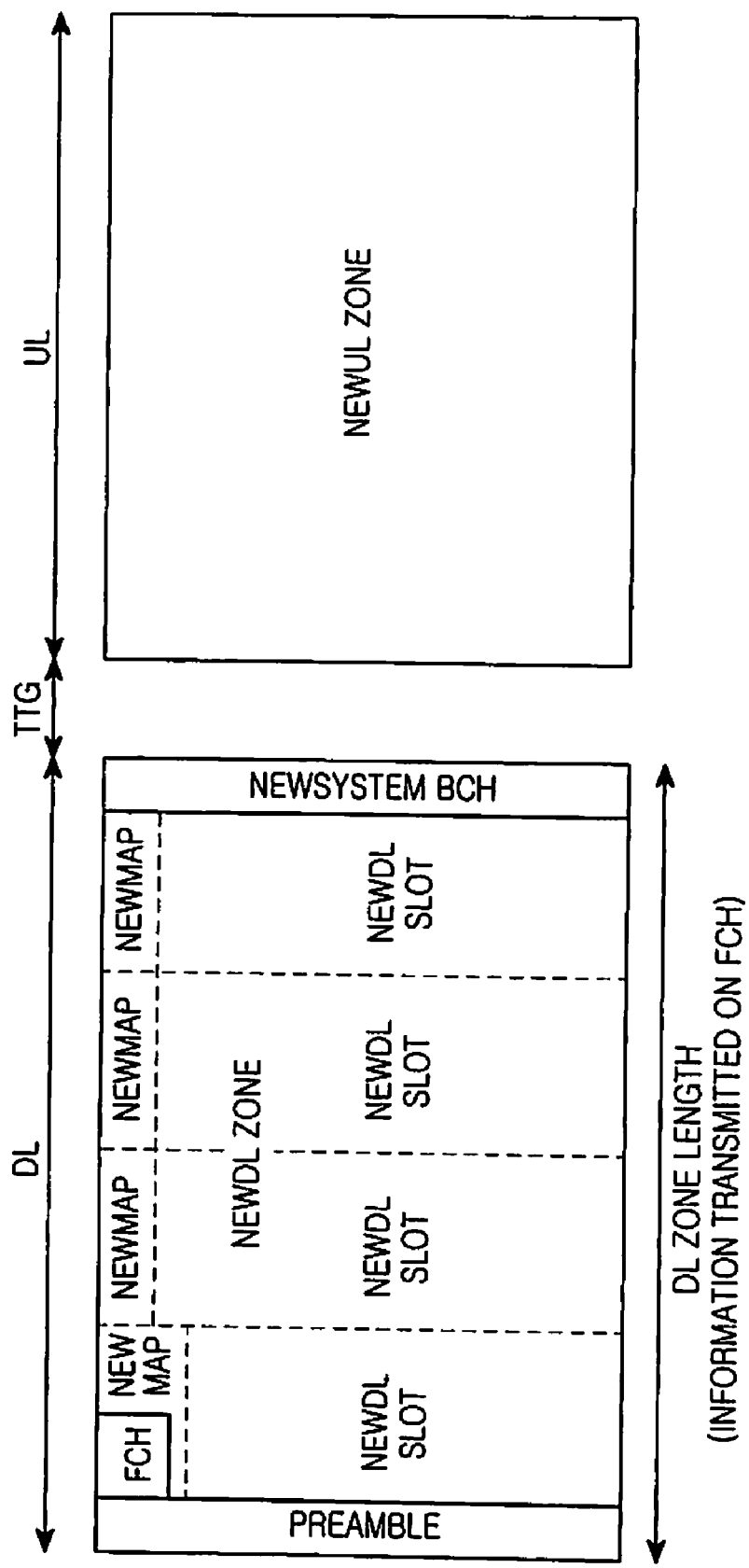
FIGS. 5A and 5B are diagrams illustrating a frame structure only for a new communication system according to an embodiment of the present invention.
Figure 5B:
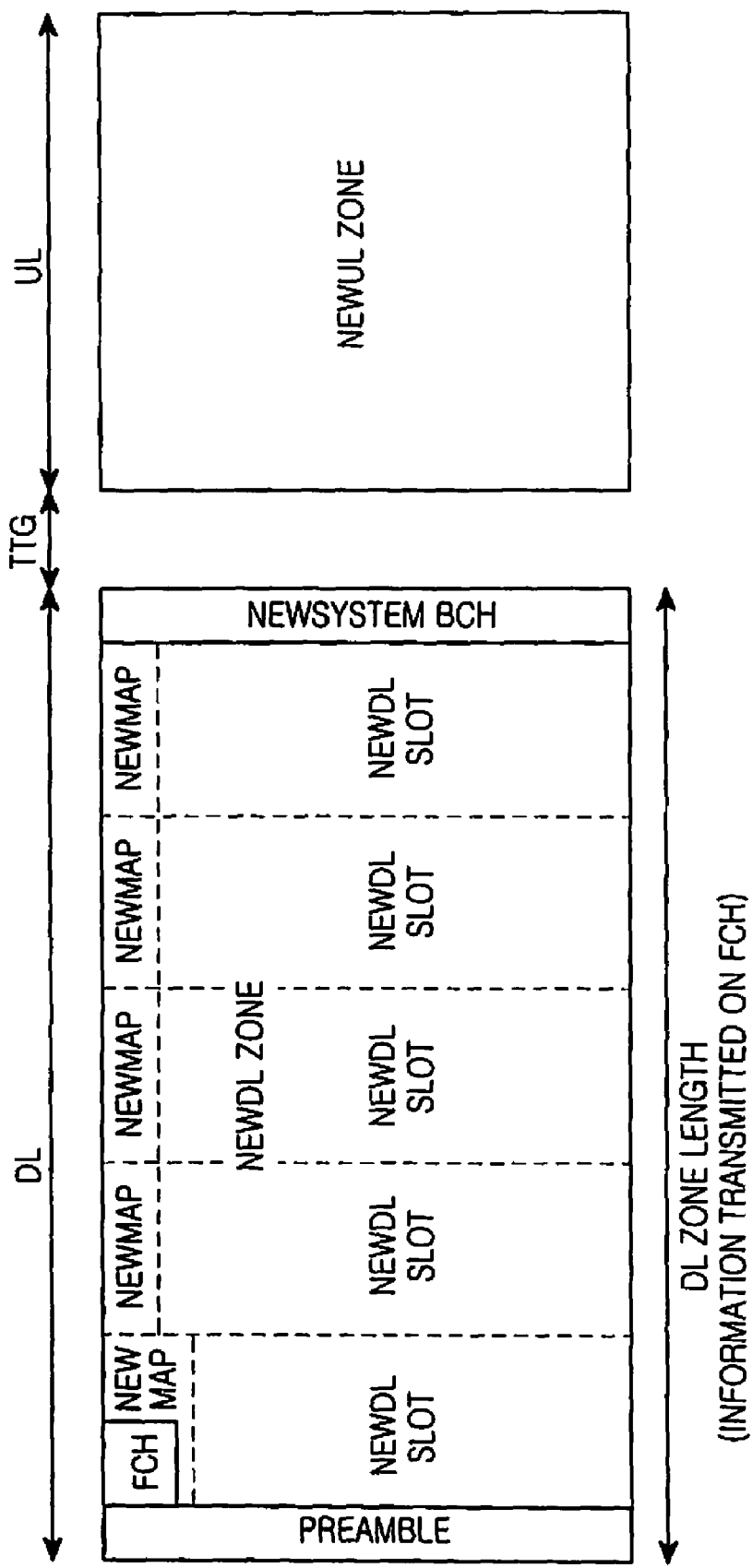

FIGS. 5A and 5B are diagrams illustrating a frame structure only for a new communication system according to an embodiment of the present invention.

Referring to FIGS. 5A and 5B, it can be noted that BCH is positioned in the last symbol in the frame. In this case, FCH should include position information of the BCH.

Figure 6A:
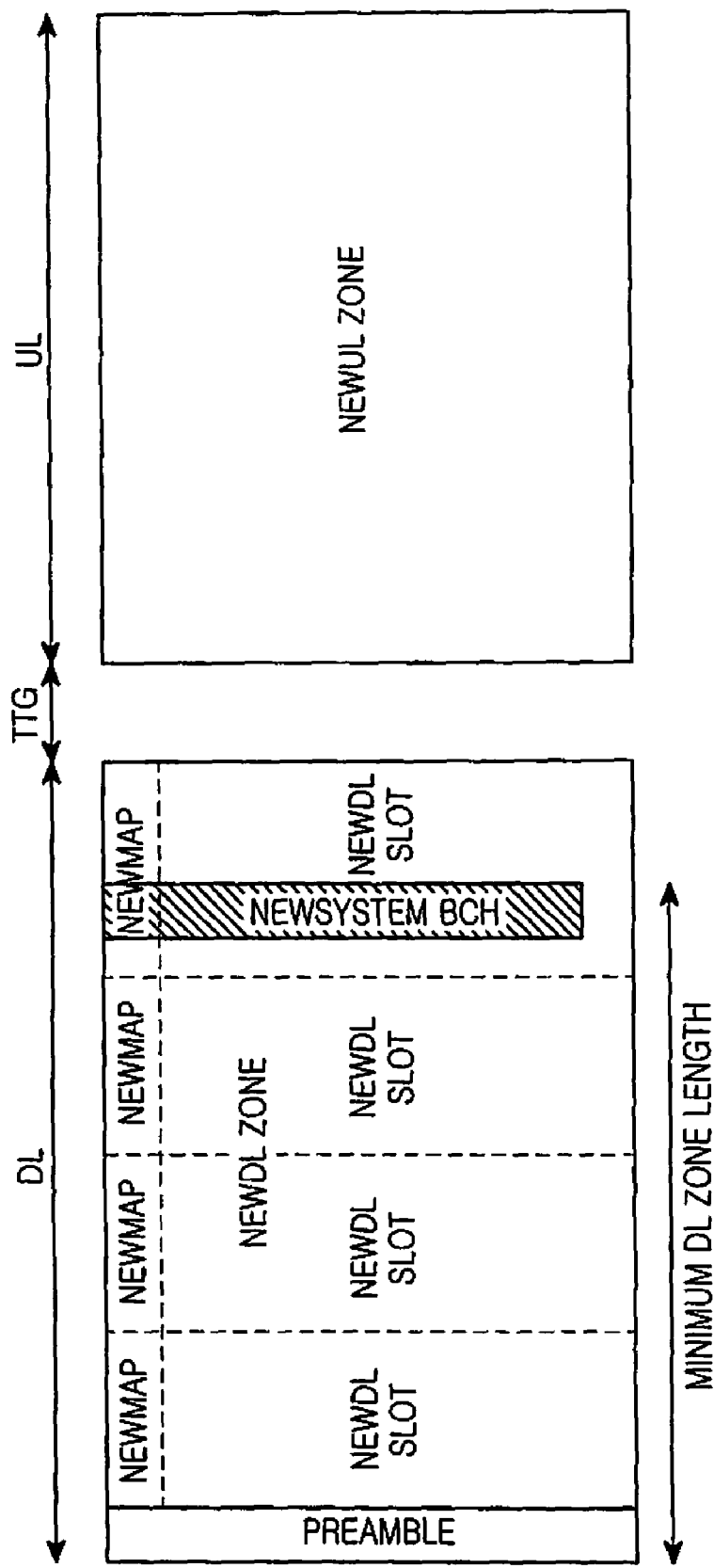
FIGS. 6A and 6B are diagrams illustrating a frame structure only for a new communication system according to an embodiment of the present invention.
Figure 6B:
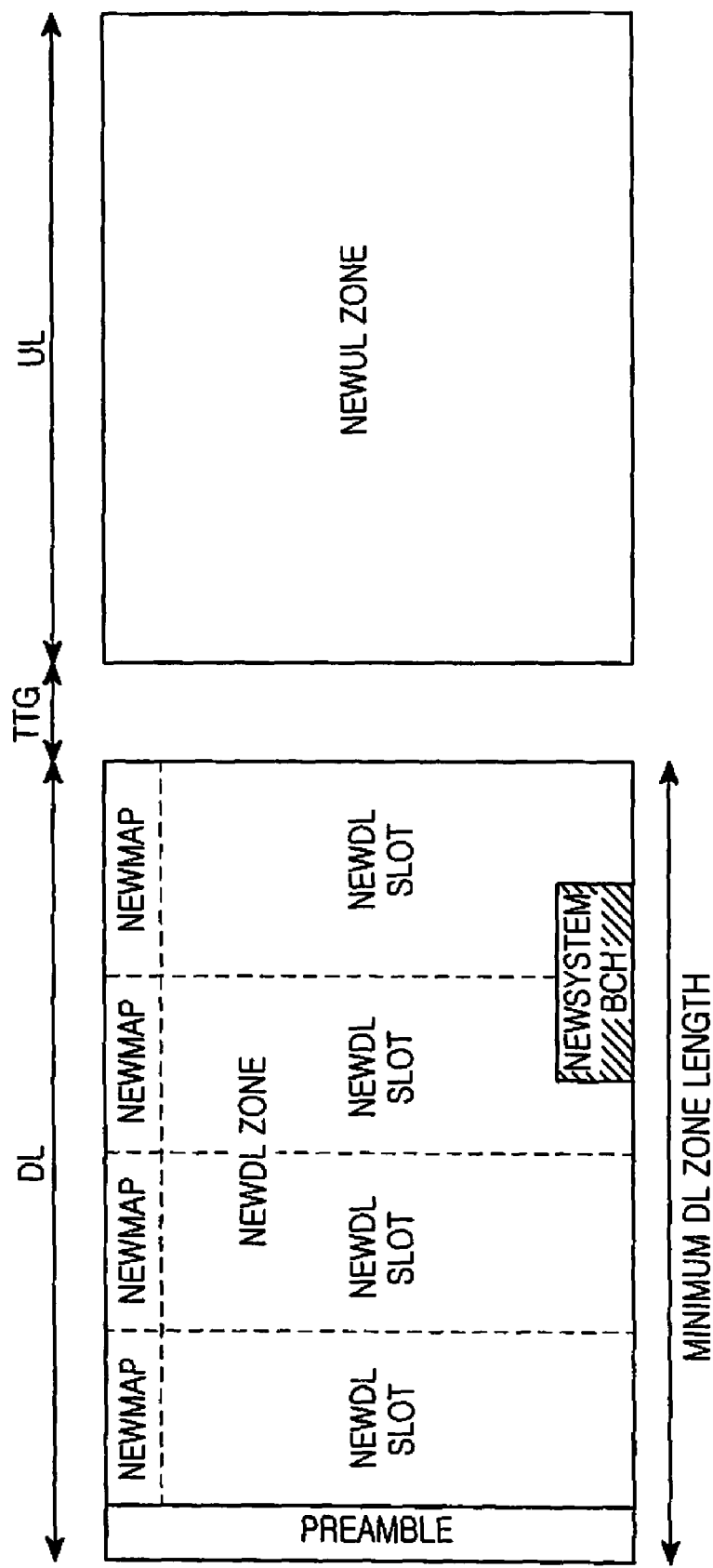

FIGS. 6A and 6B are diagrams illustrating a frame structure only for a new communication system according to an embodiment of the present invention.

Referring to FIG. 6A, it can be noted that BCH is positioned in a particular symbol in the frame. The particular symbol can be, for example, a $24^{th}$ symbol.

Referring to FIG. 6B, BCH is positioned over two slots. The BCH can occupy at least one symbol zone.

Figure 7:
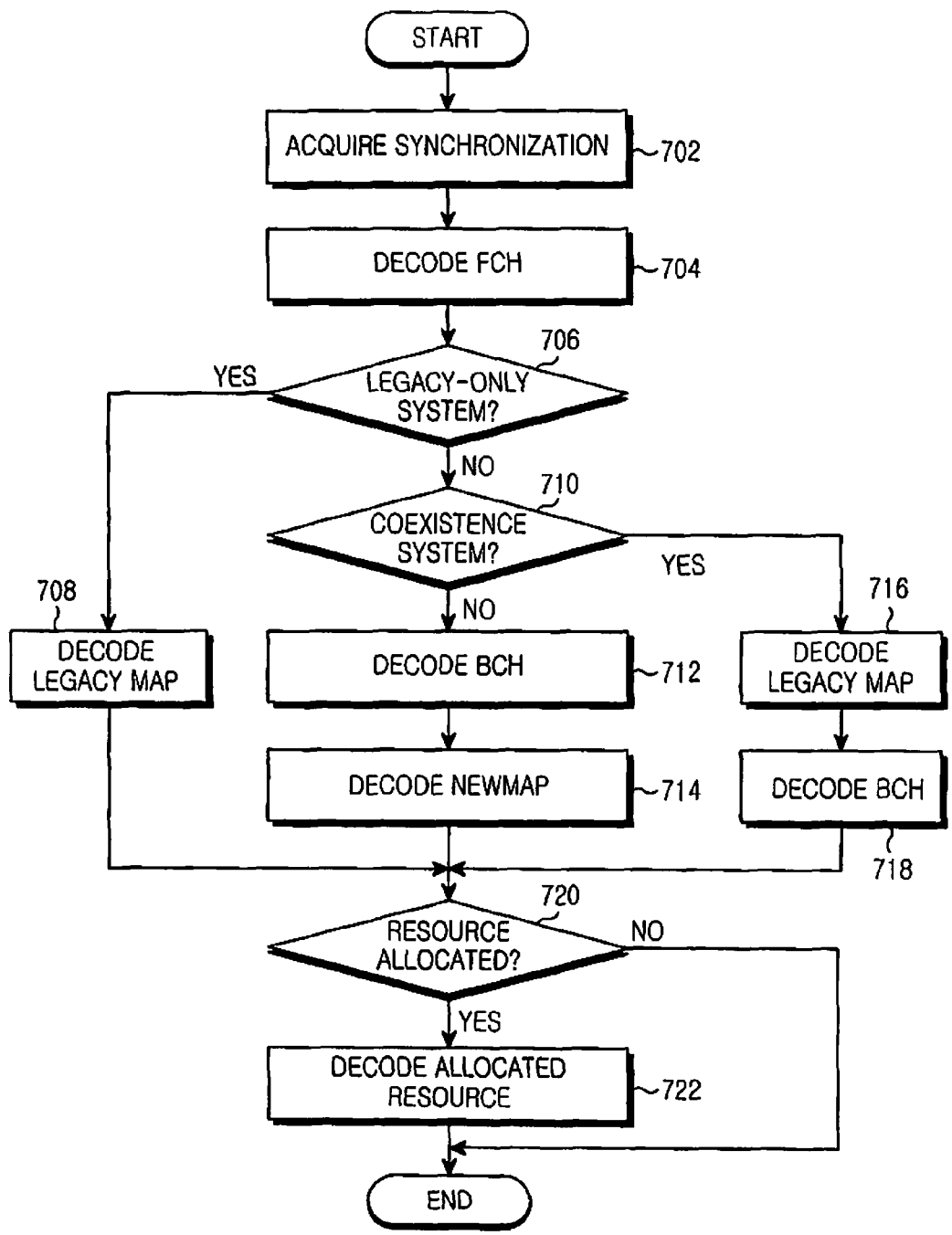
FIG. 7 is a flowchart illustrating a process of decoding resource allocation information by a mobile station of a new system according to an embodiment of the present invention.

FIG. 7 is a flowchart illustrating a process of decoding resource allocation information by a mobile station of a new system according to an embodiment of the present invention.

Referring to FIG. 7, in step 702, a mobile station acquires synchronization using a preamble. In step 704, the mobile station decodes frame information, i.e., FCH, and then proceeds to step 706. The frame information includes at least one of information indicating whether the corresponding frame is a frame only for the legacy communication system, a frame for a coexistence system, or a frame only for the new communication system, and position and size information of BCH in the frame including the BCH, using reserved bits of FCH according to the transmission scheme. The frame information can be provided to the mobile station using a unique preamble. That is, the mobile station can find out the frame structure corresponding to the received preamble. In step 706, the mobile station determines whether the corresponding frame is a frame only for the legacy communication system. If it is determined that the corresponding frame is a frame only for the legacy communication system, the mobile station proceeds to step 708, and otherwise, proceeds to step 710. In step 708, the mobile station decodes a legacy MAP, and then proceeds to step 720.

Meanwhile, the mobile station determines in step 710 whether the corresponding frame is a frame for the coexistence system. If it is determined that the corresponding frame is a frame not for the coexistence system but only for the new communication system, the mobile station proceeds to step 712, and if the corresponding frame is a frame for the coexistence system, the mobile station proceeds to step 716.

In step 712, the mobile station, previously recognizing the position and size of BCH preset by the system, decodes the BCH. In step 714, the mobile station decodes a new MAP only for the new communication system, and then proceeds to step 720.

In step 716, the mobile station decodes a legacy MAP and detects the presence of BCH corresponding to a GCID. In step 718, the mobile station decodes the BCH, and then proceeds to step 720.

In step 720, the mobile station determines whether there is any resource allocated for the mobile station itself. If it is determined that there is any allocated resource, the mobile station decodes the allocated resources in step 722.

Figure 8:
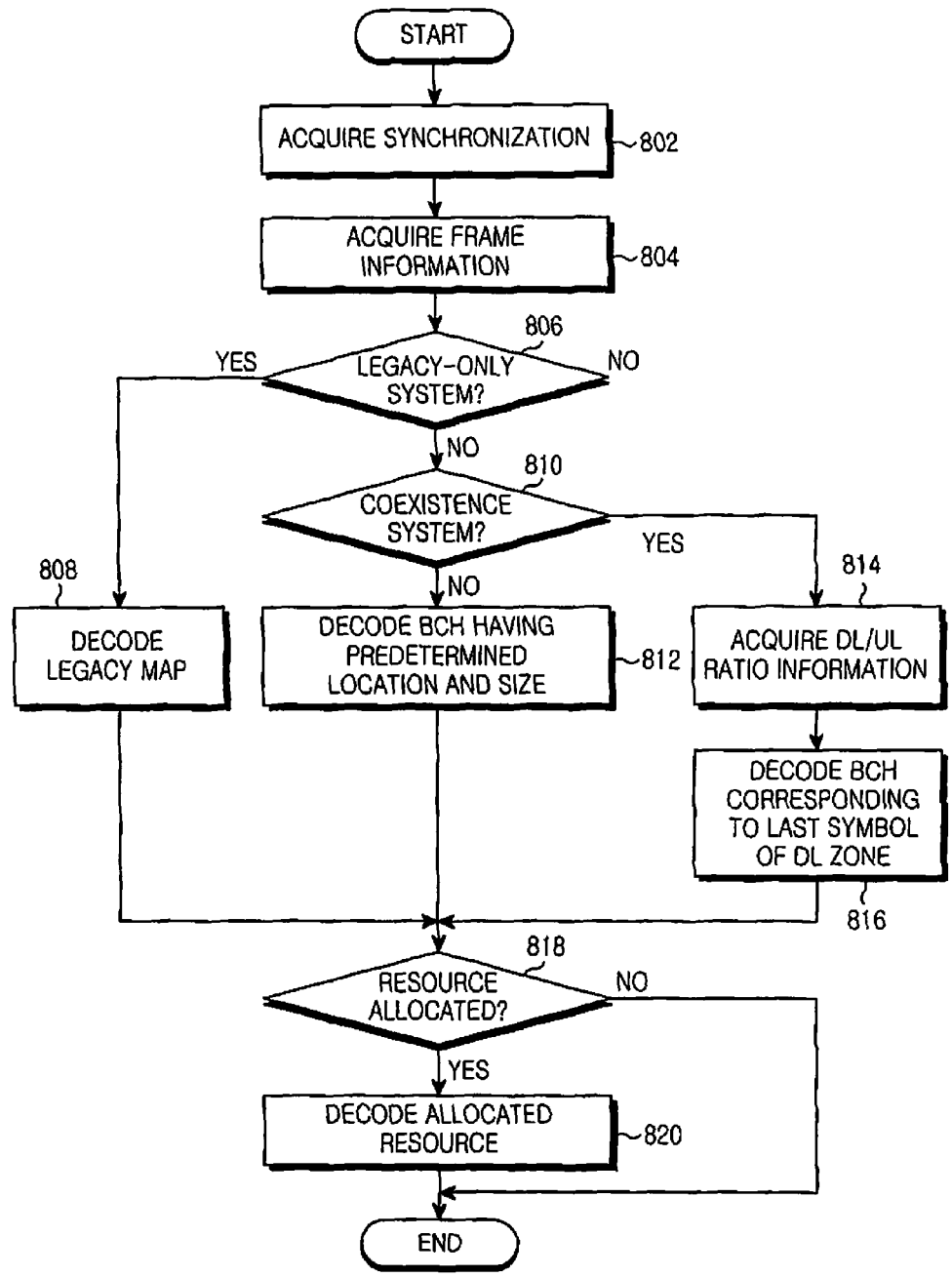
FIG. 8 is a flowchart illustrating a process of decoding allocated resources by a mobile station according to another embodiment of the present invention.

FIG. 8 is a flowchart illustrating a process of decoding allocated resources by a mobile station according to another embodiment of the present invention.

Referring to FIG. 8, in step 802, a mobile station acquires synchronization using a preamble. In step 804, the mobile station acquires frame information, and then proceeds to step 806. The frame information can be acquired using FCH or a preamble pattern. The frame information includes at least one of ratio information of the downlink subframe to the uplink subframe of the frame, and position and size information of BCH.

In step 806, the mobile station determines whether the corresponding frame is a frame only for the legacy communication system. If it is determined that the corresponding frame is a frame only for the legacy communication system, the mobile station proceeds to step 808 where it decodes a legacy MAP, and then proceeds to step 818.

However, if the corresponding frame is not a frame for the legacy communication system, the mobile station determines in step 810 whether the corresponding frame is a frame for the coexistence system. If the corresponding frame is not a frame for the coexistence system but a frame only for the new communication system, the mobile station proceeds to step 812, and if the corresponding frame is a frame for the coexistence system, the mobile station proceeds to step 814.

In step 812, the mobile station decodes BCH having predetermined position and size, and then proceeds to step 818. For example, the BCH can be positioned in the first symbol after the preamble.

In step 814, the mobile station acquires DL:UL ratio information recognized by the FCH decoding. In step 816, the mobile station decodes BCH positioned in the last symbol of the downlink subframe (DL), and then proceeds to step 818. For example, the last symbol means the $30^{th}$ symbol for a frame having a ratio of DL:UL=30:12.

In step 818, the mobile station determines whether there is any resource allocated to the mobile station itself. If there are allocated resources, the mobile station decodes the corresponding resources in step 820.

Figure 9:
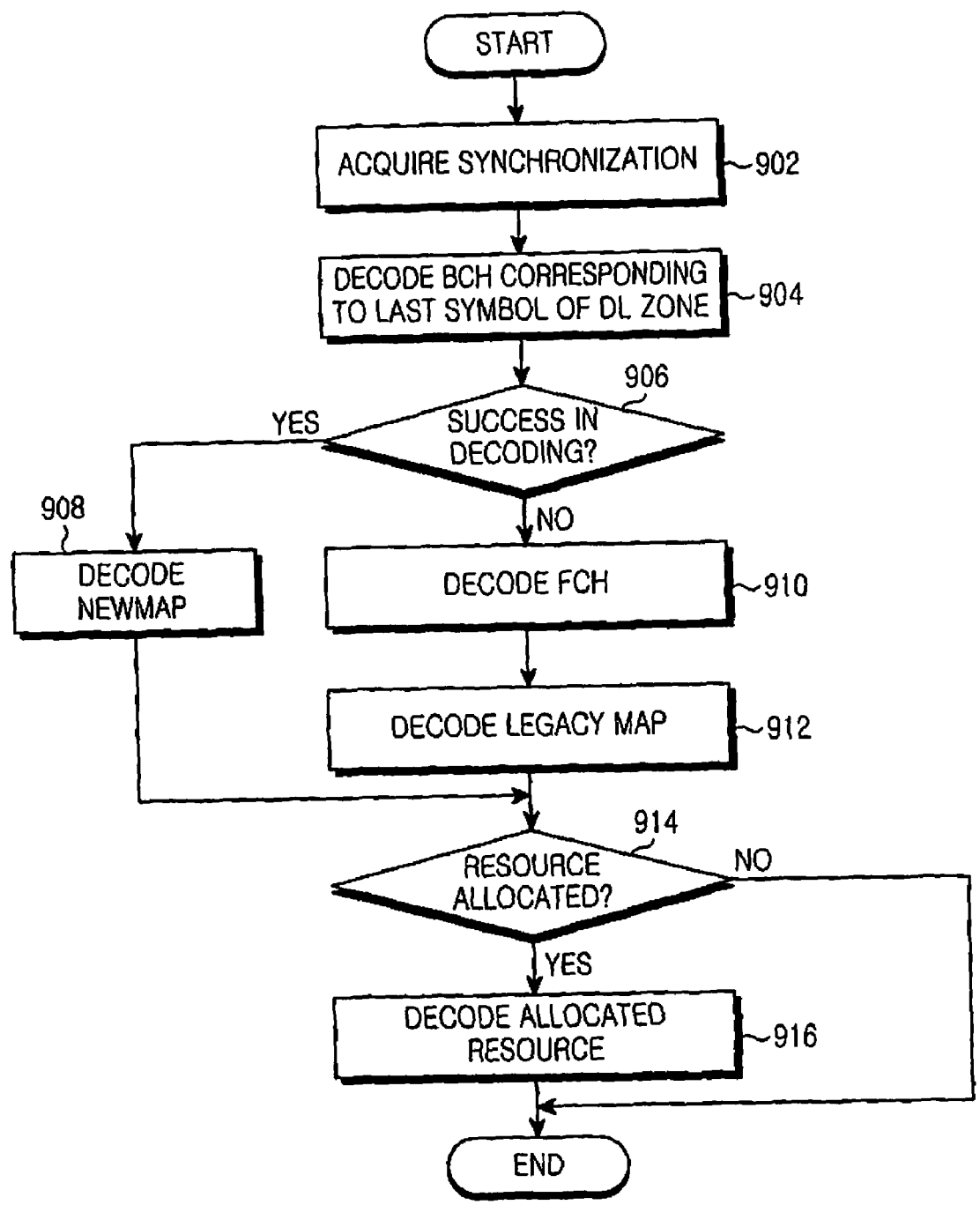
FIG. 9 is a flowchart illustrating a process of operating according to the success/failure in BCH decoding by a mobile station according to further another embodiment of the present invention.

FIG. 9 is a flowchart illustrating a process of operating according to the success/failure in BCH decoding by a mobile station according to further another embodiment of the present invention.

Referring to FIG. 9, in step 902, a mobile station acquires synchronization using a preamble. In step 904, the mobile station decodes BCH positioned in a preset symbol, and then proceeds to step 906. The BCH can be positioned in any one of the first symbol after the preamble, the last symbol of the downlink subframe zone, and a particular symbol. In step 906, the mobile station determines whether it has succeeded in decoding of the BCH. If the mobile station has succeeded in decoding of the BCH, the mobile station decodes a new MAP for the new communication system in step 908, and then proceeds to step 914.

However, if the mobile station has failed in decoding of the BCH, the mobile station decodes FCH in step 910. In step 912, the mobile station decodes a legacy MAP, and then proceeds to step 914.

As a result of steps 908 and/or 912, the mobile station can determine the presence/absence of resources allocated thereto and the position and size of the allocated resources. Therefore, the mobile station determines in step 914 whether there is any resource allocated to the mobile station itself. If there are allocated resources, the mobile station decodes the corresponding resources in step 916.

As is apparent from the foregoing description, the present invention provides a system and method for variably determining a ratio of the downlink subframe to the uplink subframe and transmitting common control information when the legacy communication system is replaced by the new communication system in the wireless communication system, making it possible to provide better communication services to the users.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting common control information by a base station in a wireless communication system, the method comprising:
    determining whether the wireless communication system is a coexistence system, in which a legacy system and a new system, different from the legacy system, coexist;
    when the wireless communication system is a coexistence system, indicating information for coexistence of the legacy system and the new system, position and size information of a resource allocation zone where common control information for the new system is to be transmitted, and information necessary for decoding of the resource allocation zone, through a first information element in a downlink subframe where resources are occupied for the legacy system; and
    transmitting the common control information of the new system in the resource allocation zone.

2. The method of claim 1, wherein the resource allocation zone where the common control information is transmitted has a size and position predefined based on a last symbol of the downlink subframe.

3. The method of claim 2, further comprising:
    transmitting resource ratio information of an uplink to a downlink in a position corresponding to a last symbol of downlink resources.

4. The method of claim 1, wherein the resource allocation zone where the common control information is transmitted is a zone which corresponds to a last symbol based on a symbol ratio of a downlink subframe having a minimum number of downlink subframe symbols to an uplink subframe, among symbol ratios of the downlink subframe to the uplink subframe, which is variably determined according to a bandwidth used in the wireless communication system.

5. The method of claim 4, wherein the resource allocation zone where the common control information is transmitted has a size and position predefined based on an $N^{th}$ symbol, when the number of symbols of the downlink subframe varies from a minimum of N to a maximum of M according to a bandwidth.

6. The method of claim 1, further comprising:
    setting a bit value indicating presence of the coexistence system using bits unused in the legacy system among all bits of a Frame Control Header (FCH) for the legacy system, when the wireless communication system is a coexistence system.

7. The method of claim 6, wherein the bit value indicates a position of a symbol where the common control information is transmitted.

8. The method of claim 1, further comprising:
    setting the resource allocation zone in a predefined position where the common control information is to be transmitted, when the wireless communication system is not a coexistence system and is a wireless communication system in which only the new system, which evolved from the legacy system, exists.

9. The method of claim 8, further comprising:
    setting the predefined position as at least one of a first symbol after a preamble, a last symbol of the downlink subframe and a particular symbol in the downlink subframe; and
    transmitting common control information of the new system through the set symbol position.

10. The method of claim 1, further comprising:
    allocating a common control channel of the new system depending on common control information of the legacy system, using a group Identifier (ID) allocated in common to all mobile stations of the new system.

11. The method of claim 10, wherein the common control information of the legacy system is MAP, and a group ID allocated to all mobile stations of the new system is a Connection ID (CID) used for identifying a connection to a mobile station of the legacy system.

12. A method for receiving common control information by a mobile station in a wireless communication system, the method comprising:
    decoding information on a frame structure transmitted from a base station;
    determining whether a wireless communication system is a coexistence system where a legacy system and a new system, different from the legacy system, coexist;
    decoding common control information for the legacy system when the wireless communication system is a coexistence system;
    acquiring information on a position and size where common control information for the new system is transmitted, and information necessary for decoding of the common control information according to the decoding result on the common control information; and
    decoding common control information for the new system using the acquired information.

13. The method of claim 12, further comprising:
acquiring resource allocation information for a mobile station of the new system according to the decoding result on the common control information of the new system; and
decoding a corresponding resource when the resource is allocated to the mobile station.

14. The method of claim 12, further comprising:
receiving and decoding downlink resource ratio information;
acquiring information on a last symbol of a downlink subframe according to the decoding result; and
decoding common control information of the new system, which has a size and position predefined based on a last symbol of the downlink subframe.

15. The method of claim 12, wherein the common control information has a size and position which is predefined based on a last symbol in a symbol ratio of a downlink subframe having a minimum number of downlink subframe symbols to an uplink subframe, among symbol ratios of the downlink subframe to the uplink subframe, which is variably determined according to a bandwidth used in the wireless communication system.

16. The method of claim 12, wherein the information on the frame structure comprises information indicating coexistence of the legacy system and the new system, and is transmitted from the base station using some bits among bits unused in the legacy system in a Frame Control Header (FCH) of the legacy system.

17. The method of claim 12, wherein the information on the frame structure comprises information indicating coexistence of the legacy system and the new system, and is transmitted from the base station using a preamble corresponding to the information on the frame structure.

18. The method of claim 12, further comprising:
decoding common control information transmitted in a predefined position using resources of a predetermined size, when the wireless communication system is not a coexistence system but a wireless communication system where only the new system evolved from the legacy system exists;
decoding MAP for the new system according to the decoding result on the common control information; and
decoding a data burst allocated to the mobile station according to the decoding result on MAP for the new system.

19. The method of claim 18, wherein the predefined position corresponds to at least one of a first symbol after a preamble, a last symbol of a downlink subframe, and a particular symbol in the downlink subframe.

20. The method of claim 12, further comprising:
acquiring symbol ratio information of a downlink subframe to an uplink subframe through decoding of reserved bits unused in the legacy system in an FCH of the legacy system.

21. The method of claim 12, further comprising:
acquiring resource allocation information corresponding to a group Connection Identifier (CID) allocated to a mobile station of the new system while decoding common control information for the legacy system;
decoding common control channel information of the new system, which is transmitted in a position designated in the acquired resource allocation information; and
acquiring resource allocation information allocated to a CID uniquely allocated to each mobile station through a MAP message of the new system, and decoding the corresponding resource.

22. A wireless communication system comprising:
a mobile station; and
a base station;
wherein the base station determines whether a legacy system and a new system, different from the legacy system, coexist in the wireless communication system, in which the wireless communication system is a coexistence system; when the wireless communication system is a coexistence system, the base station indicates information for coexistence of the legacy system and the new system, position and size information of a resource allocation zone where common control information for the new system is to be transmitted, and information necessary for decoding of the resource allocation zone, through a first information element in a downlink subframe where resources are occupied for the legacy system; and the base station transmits the common control information of the new system in the resource allocation zone;
wherein the mobile station decodes information on a frame structure transmitted from the base station; determines whether the wireless communication system is a coexistence system where the legacy system and the new system, different from the legacy system, coexist; decodes common control information for the legacy system when the wireless communication system is a coexistence system; acquires information on a position and size where common control information for the new system is transmitted, and information necessary for decoding of the common control information according to the decoding result on the common control information; and decodes common control information for the new system using the acquired information.

23. The wireless communication system of claim 22, wherein the resource allocation zone where the common control information is transmitted has a size and position predefined based on a last symbol of the occupied downlink subframe.

24. The wireless communication system of claim 22, wherein the base station transmits resource ratio information of an uplink to a downlink in a position corresponding to a last symbol of downlink resources.

25. The wireless communication system of claim 22, wherein the resource allocation zone where the common control information is transmitted is a zone which corresponds to a last symbol based on a symbol ratio of a downlink subframe having a minimum number of downlink subframe symbols to an uplink subframe, among a symbol ratios of the downlink subframe to the uplink subframe, which is variably determined according to a bandwidth used in the wireless communication system.

26. The wireless communication system of claim 25, wherein the resource allocation zone where the common control information is transmitted has a size and position predefined based on an $N^{th}$ symbol, when the number of symbols of the downlink subframe varies from N to M according to the bandwidth.

27. The wireless communication system of claim 22, wherein the base station sets a bit value indicating presence of the coexistence system in a Frame Control Header (FCH), when the wireless communication system is a coexistence system.

28. The wireless communication system of claim 27, wherein the bit value indicates a position of a symbol where the common control information is transmitted.

29. The wireless communication system of claim 22, wherein the base station sets a position of a resource allocation zone where the common control information is to be transmitted, in at least one of a first symbol after a preamble, a last symbol of a downlink subframe, and a particular symbol in the downlink subframe; and transmits common control information of the new system through the set resource allocation zone, when the wireless communication is not a coexistence system and is a wireless communication system in which only the new system, which evolved from the legacy system, exists.

30. The wireless communication system of claim 22, wherein the base station allocates a position of a common control channel of the new system depending on common control information of the legacy system, using a group Identifier (ID) allocated in common to all mobile stations of the new system.

31. The wireless communication system of claim 30, wherein the common control information of the legacy system is MAP, and a group ID allocated to all mobile stations of the new system is a Connection ID (CID) used for identifying a connection to a mobile station of the legacy system.

* * * * *